US006181367B1

(12) United States Patent
McGrew et al.

(10) Patent No.: US 6,181,367 B1
(45) Date of Patent: Jan. 30, 2001

(54) VIDEO IMAGE VIEWING DEVICE AND METHOD

(75) Inventors: Stephen P. McGrew; P. David DeVries; Roger F. Wink; David H. Foster, all of Spokane, WA (US)

(73) Assignee: New Light Industries, Ltd., Spokane, WA (US)

( * ) Notice: Under 35 U.S.C. 154(b), the term of this patent shall be extended for 0 days.

(21) Appl. No.: 09/354,968

(22) Filed: Jul. 16, 1999

Related U.S. Application Data (63) Continuation of application No. 08/856,022, filed on May 13, 1997, now Pat. No. 5,973,727.

(51) Int. Cl.[7] .................................................. H04N 13/00

(52) U.S. Cl. .............................. 348/41; 348/51; 348/739; 348/750; 348/790; 345/5; 345/6

(58) Field of Search ................................. 348/40–43, 46, 348/51, 53, 59, 115, 739, 744, 750–751, 758–761, 790–791, 801–802, 795; 345/905, 903, 214, 205, 91–92, 87, 48–50, 44, 41, 8–9, 5–6, 3; 359/462, 477, 376, 13–14

(56) References Cited

U.S. PATENT DOCUMENTS

| | | | | |
|---|---|---|---|---|
| 5,223,925 | * | 6/1993 | Hattori | 348/48 |
| 5,357,355 | * | 10/1994 | Arai | 349/69 |
| 5,543,862 | * | 8/1996 | Culkin | 348/739 |
| 5,647,036 | * | 7/1997 | Deacon et al. | 385/27 |
| 5,664,032 | * | 9/1997 | Bischel et al. | 385/4 |
| 5,671,031 | * | 9/1997 | Nakamura et al. | 349/106 |
| 5,680,233 | * | 10/1997 | Faris et al. | 353/122 |
| 5,771,321 | * | 6/1998 | Stern | 385/31 |
| 5,777,588 | * | 7/1998 | Woodgate et al. | 345/6 |
| 5,784,129 | * | 7/1998 | Konuma et al. | 348/739 |
| 5,825,337 | * | 10/1998 | Wiseman et al. | 345/6 |
| 5,874,929 | * | 2/1999 | Opower et al. | 345/32 |
| 5,886,675 | * | 3/1999 | Aye et al. | 345/7 |
| 5,917,539 | * | 6/1999 | Sorensen et al. | 348/56 |
| 5,973,727 | * | 10/1999 | McGrew et al. | 348/41 |

OTHER PUBLICATIONS

Meadows, M. R. et al., "Electro–optic switching using total internal reflection by a ferroelectric liquid crystal" *Appl. Phys. Lett.* 54 (15), Apr. 10, 1989, pp. 1394–1396.

Amitai, Y. et al., "Visor–display design based on planar holographic optics" *Applied Optics*, 34 (8), Mar. 10, 1995, pp. 1352–1356.

LoPresti, P. G. et al., "All–Optical Switching of Infrared Optical Radiation Using Isotropic Liquid Crystal" *IEEE Journal of Quantum Electronics*, 31 (4), Apr. 1995, pp. 723–728.

(List continued on next page.)

*Primary Examiner*—Vu Le
(74) *Attorney, Agent, or Firm*—Dorsey & Whitney LLP (57) ABSTRACT

A video image viewing device includes first and second glass plates having a layer of liquid crystal therebetween. A plurality of laser diodes extending along a line near one edge of the first plate are selectively illuminated at an intensity corresponding to the amplitude of a video signal during each of a plurality of video lines. The light propagates through the first plate via total internal reflection not entering the liquid crystal layer until it reaches an area where the refractive index of the liquid crystal is selectively modified. The refractive index may be modified by selectively energizing each of a plurality of horizontal strip electrodes vertically spaced from each other. The electrodes are sequentially energized to frustrate the total internal refraction and thereby cause the light to be transmitted through the liquid crystal layer into the second plate at a location corresponding to the location of video line in a video frame of the video signal. One or more holographic optical elements diffract light passing into the second plate to a predetermined direction, thereby forming a unique virtual image point location for each combination of single electrode pair activation and laser diode activation.

39 Claims, 10 Drawing Sheets

OTHER PUBLICATIONS

Resler, D. P. et al., "High–efficiency liquid–crystal optical phased–array beam steering" *Optics Letters*, 21 (9), May 1, 1996, pp. 689–691.

Ehbets, Peter et al., "High–carrier–frequency fan–out gratings fabricated by total internal reflection holographic lithography" *Optical Engineering*, 34 (8), Aug. 1995, pp. 2377–2383.

Khoo, I. C. and Zhou, Ping, "Dynamics of switching total internal reflection to transmission in a dielectric–cladded nonlinear film" *J. Opt. Soc. Am. B 6* (5), May 1989, pp. 884–888.

Johnson, Richard V. et al., "Characteristics of the linear array total internal reflection (TIR) electrooptic spatial light modulator for optical information processing" *Optical Engineering*, 22 (6), Nov./Dec. 1983, pp. 665–674.

Hirabayshi, Katsuhiko et al., "Free–space optical interconnections with liquid–crystal microprism arrays" *Applied Optics*, 34 (14), May 10, 1995, pp. 2571–2580.

Maciak, Tadeusz et al., "Thermo–optic switch with a total internal reflection for integrated optics applications" *In'l J. of Optoelectronics*, 5(1), 1990, pp. 47–50.

\* cited by examiner

VIDEO IMAGE VIEWING DEVICE AND METHOD

CROSS-REFERENCE TO RELATED APPLICATION

This application is a continuation of U.S. patent application No. 08/856,022, filed May 13, 1997, now U.S. Pat. No. 5,973,727.

TECHNICAL FIELD

This invention relates to viewing devices for video images, and more particularly to compact and lightweight video viewing device that can be adapted to a variety of applications including virtual reality viewing glasses and video monitors.

BACKGROUND OF THE INVENTION

Video viewing devices are in common use for a wide variety of applications. Cathode ray tube ("CRT") displays have long been used for television viewing, and more recently as computer monitors. More compact devices for viewing video images, such as liquid crystal display ("LCD") screens, have been developed as a substitute for CRT displays.

More recently compact, lightweight head mounted displays have been introduced as viewing devices for "virtual reality" systems. By providing a separate viewing device for each eye and appropriately varying the image viewable though each device, high-resolution stereographic video images may be displayed.

Another type of viewing device for video images are "heads up displays" ("HUD's") that enable jet fighter pilots to process mentally a huge amount of information pertaining to both the space surrounding the aircraft and the condition and performance of the aircraft. This has led to the development of HUD's built into the transparent canopy of aircraft, as well as "head-mounted displays" and "visor displays."

All of the above-described HUD's require light projected from a source display (such as a liquid crystal television screen) to travel some distance through air to a reflective, refractive or diffractive surface where the light is redirected to form a virtual image of the source display. A holographic optical element typically serves as a diffractive surface in such displays, and typically is highly color selective. However, it would be desirable to view a video image, particularly a three dimensional image, by directly generating a three-dimensional virtual image without the need for transmitting light from a source display through the air. If a technique could be found for avoiding the need to transmit light though the air over a substantial distance, the viewing device could be extremely compact, and could even closely resemble an ordinary pair of eyeglasses. The compact, lightweight and unobtrusive nature of such a viewing device would open up a multitude of new applications, such as allowing use as a monitor for a pocket-sized computer, a superior virtual reality viewing device, or as a prosthetic for deaf people to display visual cues derived from sound.

SUMMARY OF THE INVENTION

The inventive viewing device is adapted to display a virtual image corresponding to a video signal having a plurality of video lines in each video frame. A light generator selectively directs light beams into a first transparent plate at a plurality of respective locations along a surface of the first plate. The light beams are directed into the first plate in a manner that causes the light beams to propagate through the first plate with total internal reflection. An index of refraction modulator is positioned adjacent the first plate. The index of refraction modulator has a plurality of modulating elements at respective areas spaced apart from each other in the direction that the light propagates through the first plate. Each of the modulating elements is selectively controllable to either a first refractive index state or a second refractive index state responsive to a respective control signal. The first refractive index state causes the modulating element to have an index of refraction that is sufficiently different from the index of refraction of the first plate that the light beam remains internally reflected in the first plate in the area of the modulating element. The second refractive index state causes the modulating element to have an index of refraction that is sufficiently similar to the index of refraction of the first plate that a significant portion of the light beam exits the first plate in the area of the modulating element. An optical element positioned adjacent the index of refraction modulator controls the angle of divergence in the first direction of light exiting the first plate in the area of the modulating element. The light generator may be a plurality of light sources spaced apart along a surface of the first plate that are sequentially illuminated or a light beam that is scanned along a surface of the first plate. A color image may be generated by using a multicolor light generator, or by placing color selective modulating elements through which light passes as it exits the index of refraction modulator. The index of refraction modulator is preferably a layer of liquid crystal, and the modulating elements that control the refractive index of the liquid crystal layer are electrodes on opposite sides of the liquid crystal layer. The viewing device is driven by a video control circuit that receives a video signal corresponding to the intensity of a video image in each of a plurality of video lines. The video control circuit controls the intensity of each of the light beams in accordance with the amplitude of the video signal for each line. The video control circuit also generates control signals to cause each modulating element to be sequentially switched to its high index state responsive to a corresponding line of the video signal. A pair of the viewing devices may be mounted in a frame adapted to position each of the image display devices in front of a respective eye of an individual wearing the frame to allow stereoscopic viewing.

DETAILED DESCRIPTION OF THE INVENTION

Figure 1:
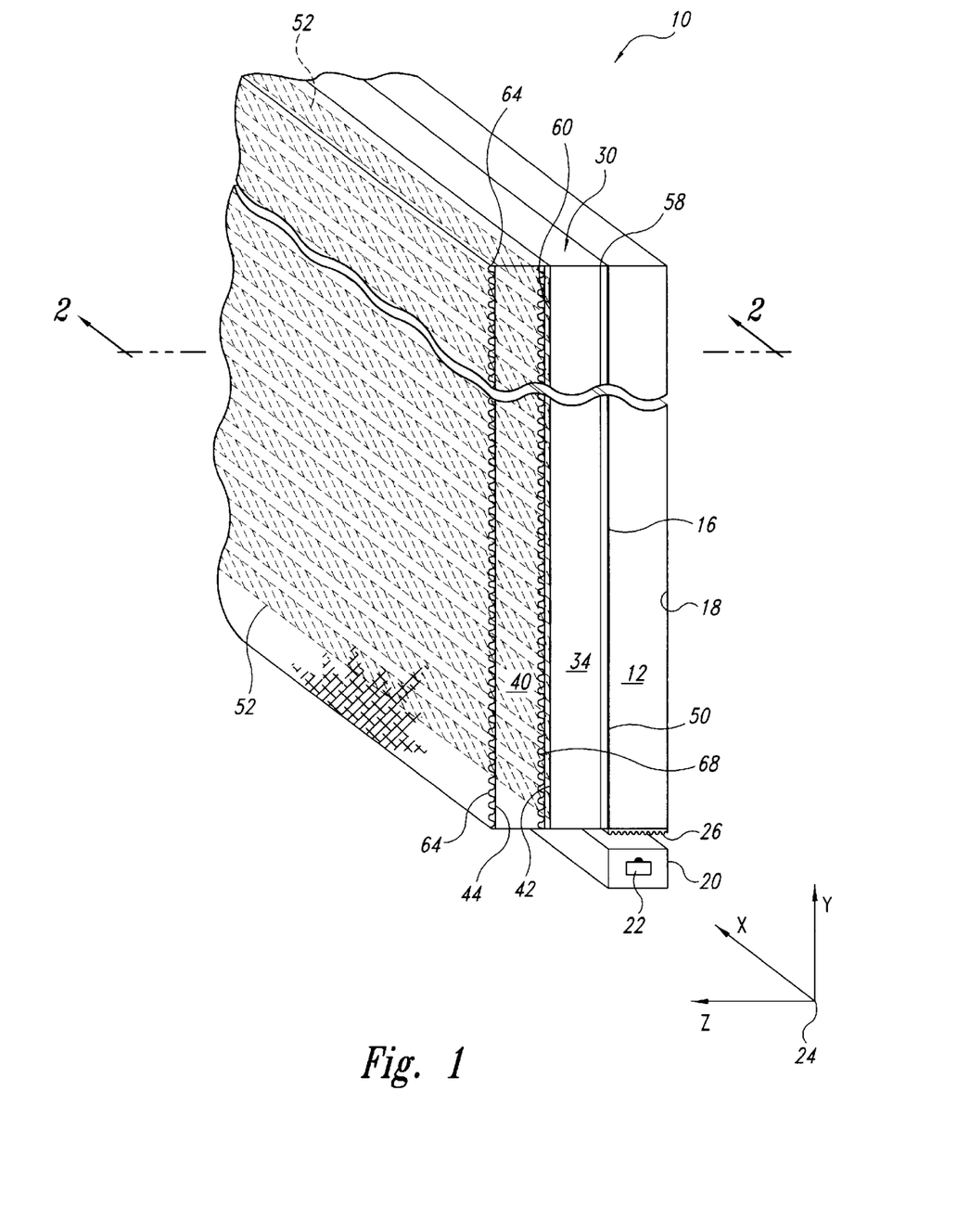
FIG. 1 is an isometric view of a preferred embodiment of a portion of a viewing screen according to the invention.

A preferred embodiment of the invention is illustrated in FIG. 1 as a single viewing screen 10, it being understood that a screen may be positioned in front of each eye for stereographic viewing purposes as described below. The viewing screen 10, a portion of which is illustrated in FIG. 1, includes a base plate 12 of a high refractive index transparent material, such as flint glass or glass containing a high lead content. In a preferred embodiment of the invention, the base plate 12 has a refractive index of 1.68 and a thickness of 2 mm., although base plates having a different refractive index or dimension may be used. The base plate 12 shown in FIG. 1 is planar, although, as explained below, the base plate need not be planar.

The base plate 12 has a front face 16 and a rear face 18, the front face 16 being the surface facing the location from which an image is adapted to be viewed. Mounted along one edge of the base plate 12 is an elongated light generator 20 from which light selectively emanates from each of a plurality of longitudinally spaced localized areas each approximating a point light source. The light generator 20 is preferably composed of a linear array of laser diodes 22 positioned at suitable intervals, such as about 50 microns. However, the laser diodes 22 may be spaced at other intervals, and the light generator 20 may be implemented by other means, such as an array of light emitting diodes ("LED's"). LED's have a broader emission peak than laser diodes 22, and they do not have a spatial coherence as high as laser diodes 22. As a result, images viewed using viewing screen 10 when LED's are used as the light generator 20 may be less sharp as compared to using laser diodes 22 as the light generator 20.

For purposes of clarity in defining spatial relationships, a Cartesian coordinate system 24 is shown in FIG. 1 in which the front face 16 of the base plate 12 lies in a plane defined by the x-axis and the y-axis, and has a thickness extending along the z-axis. The light generator extends along the x-axis.

Positioned between the light generator 20 and the lower edge of the base plate 12 is a diffractive element 26 which may be formed holographically by conventional means. The diffractive element 26 is fabricated so that light emanating from the light generator 20 is diffracted at a sufficient angle to cause the light to propagate through the base plate 12 with total internal reflection from the air/glass interfaces formed at the front and rear faces 16, 18, respectively. In the preferred embodiment of the invention, the light is diffracted to an angle of 72 degrees with respect to the z-axis which is greater that the critical angle of total internal reflection for the interface between glass and air. However, other diffraction angles may be used as long as they are sufficient to provide total internal reflection. Also, other devices may be used as a substitute for the diffractive element, including a prism (not shown) or a lens (not shown). Further, the light generator 20 and diffractive element 26 may be positioned at locations other than at the edge of the base plate 12. For example, the light generator 20 and diffractive element 26 may be positioned on the front face 16 or the rear face 18 of the cover plate 12 adjacent one edge, as long as the diffractive element 26 can direct light into the base plate 12 at the desired angle and the refractive index modulator works with the resulting internally reflected beam angles.

An index of refraction modulator 30, such as a conventional total internal reflection ("TIR") modulator, covers the front face 16 of the plate. In a preferred embodiment of the invention, the index modulator 30 is a layer of liquid crystal 34 positioned between the base plate 12 and a cover plate 40 having a rear face 42 and a front face 44. A single conductive electrode 50 is formed on the front face 16 of the base plate 12 while a plurality of transparent, horizontal strip electrodes 52 are formed on the rear face 42 of the cover plate 40. The strip electrodes 52 each extend along the x-axis, and they are spaced apart from each other along the y-axis. The positions of the electrodes 50, 52 may also be reversed with the strip electrodes 52 being formed on the front face 16 of the base plate 12 and the single conductive electrode 50 being formed on while the rear face 42 of the cover plate 40. The electrodes 50, 52 may be formed from a thin, ie., on the order of 1 micron or less, layer of indium tin oxide ("ITO") which is electrically conductive and transparent. In the preferred embodiment of the invention, the strip electrodes 50 are each about 45 microns wide and about 100 nanometers thick, and they are separated from each other by a gap of about 5 microns. The liquid crystal 34 is preferably ferroelectric liquid crystal since it responds rapidly to modulation of the type described below. However, other materials may also be used including nematic liquid crystal, electro-optic media, multiple quantum well media, electron trapping materials, and photorefractive materials, to name a few. In general, any medium having a refractive index that can be switched between high and low states can be used as an index of refraction modulator 30 in place of the liquid crystal 34.

An orientation layer 58 of polymeric material is applied over the electrode 50 by suitable means such as by spin coating, dipping, meniscus coating or evaporation. In the preferred embodiment, the orientation layer 58 may have a thickness of 500 nanometers, although thinner or thicker layers may also be used. The molecules of the orientation layer 58 are then oriented in a predetermined direction by suitable means, such as by buffing with a felt-covered roller (not shown). The molecules are oriented in a suitable direction from the y-axis, such as, for example, 22 degrees from the y-axis in the x-y plane. When the liquid crystals 34 come into contact with the orientation layer 58, they align themselves with the orientation of the molecules. The liquid crystals 34 have an anisotropic refractive index when they are aligned by the molecules of the orientation layer 58.

Although the preferred embodiment of the viewing screen 10 uses as its orientation layer 58 a layer of polymeric material having molecules oriented at 22 degrees, it will be understood that other orientation angles may be used. In any case, the buffing angle should be optimized for the specific liquid crystal used to maximize the differences in refractive index measured with respect to the polarization of the light propagating in the base plate 12. Also, other approaches may be used to orienting the liquid crystal 34. For example, the surfaces of the strip electrodes 52 or the high index of refraction coating 68 may be buffed at the appropriate angle. Also, the molecules of a polymer coating (not shown) may be oriented by exposure to ultraviolet light polarized at the desired orientation angle. Alternatively, the surface of the strip electrode 52 may be coated with a monolayer of organic molecules which are then crosslinked to organic molecules using polarized ultraviolet light.

When a voltage of one polarity is applied between one of the strip electrodes 52 and the single electrode 50, the molecules of the liquid crystal 34 adjacent the energized strip electrode 52 assume one of two different alignments depending upon the polarity of the electric field. When the molecules assume the first alignment responsive to an electric field of one polarity, the liquid crystal 34 will have a relatively high index of refraction for light traveling in a given direction and having a particular state of polarization. When the molecules assume the second alignment responsive to an electric field of the opposite polarity, the liquid crystal 34 will have a relatively low index of refraction for light traveling in the same given direction. When the refractive index of the liquid crystal 34 is relatively low, light propagating though the base plate 12 is reflected from the interface between the front face 16 of the base plate 12 and the liquid crystal 34. However, when the refractive index of the liquid crystal 34 is sufficiently high, light propagating in the base plate 12 is no longer reflected from the plate/liquid crystal interface. Instead, light passes out of the base plate 12 and into the liquid crystal 34 through the energized strip electrode 52. In the preferred embodiment of the invention, the refractive index of the liquid crystal 34 is switched between 1.55 and 1.64, which is sufficient to switch the index modulator 30 from a reflective state to a transmissive state. The electric fields between the electrode 50 and each of the strip electrodes 52 are preferably generated by grounding the electrode 50 and applying either a positive or a negative voltage to each of the strip electrodes 52. However, one of the strip electrodes 52 may be selectively grounded and the single electrode 50 driven, or both the single electrode 50 and one of the strip electrodes 52 may be simultaneously driven with suitable voltages.

The cover plate 40 preferably has a high index of refraction and is preferably fabricated from a high index of refraction glass. The index of refraction of the cover plate 40 should be sufficiently high relative to the index of refraction of the liquid crystal 34 that light from the liquid crystal 34 propagates through the cover plate 40 rather than being reflected from the liquid crystal/cover plate interface. To further aid in preventing light from being reflected from the rear face 42 of the cover plate 40, or to allow the cover plate 40 to be fabricated from ordinary soda-lime glass having a relatively low refractive index, a holographic optical element 60 may be formed on the rear face 42 of the cover plate 40 beneath the strip electrodes 52. The holographic optical element 60 is preferably formed by etching the rear face 42 of the cover plate 40 by conventional means. As mentioned above, light enters the liquid crystal 34 from the base plate 12 at an angle, such as 72 degrees. The holographic optical element 60 diffracts the light in a direction that is closer to the z-axis, ie., a smaller angle relative to the z-axis, so that it is not reflected from the front face 44 of the cover plate 40. The diffraction angle of the holographic optical element 60 also controls the position of virtual images visible on the viewing screen 10, as explained in greater detail below. Another holographic optical element 64 may be formed on the front face 44 of the cover plate 40 for the reasons explained below. The holographic optical elements 60, 64 may be formed by suitable means well known to one skilled in the art.

A high-index of refraction coating 68 is also preferably formed on the rear face 42 of the cover plate 40 between the holographic optical element 60 and the strip electrode 52. The coating 64 aids in coupling light from the liquid crystal 34 to the cover plate 40.

Although the index of refraction modulator 30 in the preferred embodiment of the viewing screen 10 uses rectangular strip electrodes 52 to control the index of refraction of the liquid crystal 34 at localized areas, patterns other than rectangles may be used, including dots, curved designs, alphanumeric characters, and other configurations may be used.

In operation, each of the laser diodes 22 is sequentially energized along the light generator 20 to illuminate the base plate 12 from essentially a point light source that scans along the edge of the base plate 12. However, it will be understood that the laser diodes 22 may be illuminated in other sequences, such as an interleaving pattern. Also, more that one laser diode 22 may be illuminated at a time. In fact, since each laser diode corresponds to one pixel in each horizontal row of pixels in the image, all laser diodes may be illuminated simultaneously. As explained in greater detail below, the intensity of light from the laser diodes 22 is modulated to correspond to the intensity of pixels of an image to be viewed using the viewing screen 10.

Figure 2:
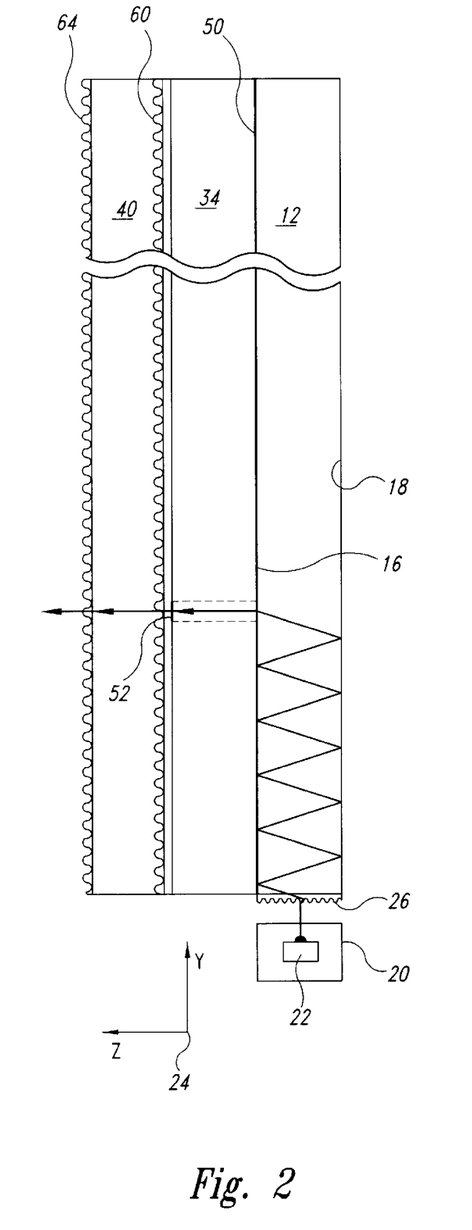
FIG. 2 is a cross-sectional view of the viewing screen of FIG. 1 taken along the line 2—2 of FIG. 1.

When light is emitted from one or more of the laser diodes 22, it propagates through the base plate 12 at a predetermined angle, such as 72 degrees, as illustrated in FIG. 2. Since the light undergoes total internal reflection, it reflects back-and-forth from the faces 16, 18 of the base plate as it propagates through the base plate 12 in the direction of the y-axis.

Figure 3:
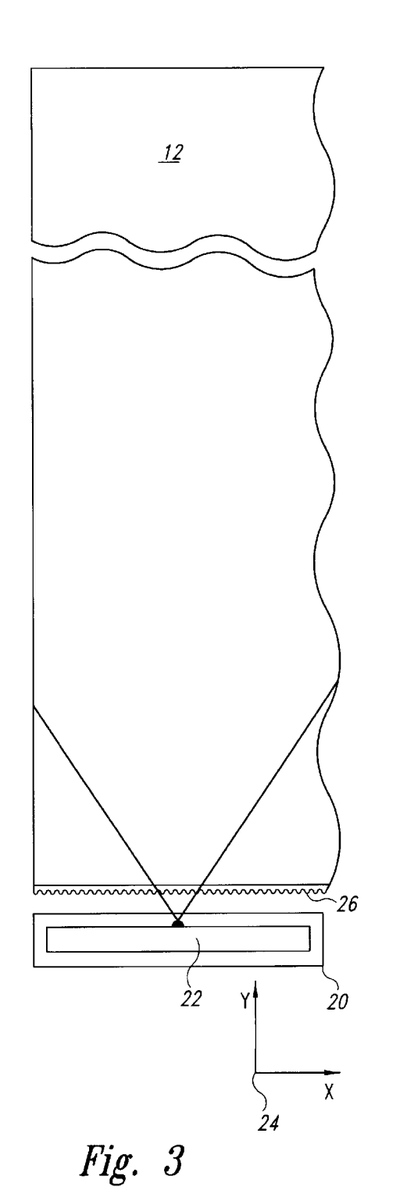
FIG. 3 is a front plan view of the viewing screen of FIG. 1.

As the light propagates though the base plate 12 in the y-axis direction, it spreads out along the width of the base plate 12 in the direction of the x-axis, as illustrated in FIG. 3. After the light has propagated a substantial distance from the light generator 20, the entire width of the base plate 12 is illuminated regardless of which laser diode 22 has generated the light. However, the horizontal position of the light source, ie., the energized laser diode 22, as viewed in the viewing screen 10 varies depending upon which laser diode 22 is illuminated. Basically, as explained further below, the horizontal position of an illuminated pixel in an image corresponds to the horizontal position of the illuminated laser diode 22. Because the light beams diverge in the preferred embodiment, horizontal position of an image pixel is dependent on both the position of the laser diode and the vertical position of the energized electrode.

Returning to FIG. 2, the light propagates through the base plate 12 until it reaches an energized strip electrode 52. The energized strip electrode 52 generates a field in the liquid crystal 34 having the polarity to increase the refractive index of the liquid crystal 34. (For purposes of clarity, only the energized strip electrode 52 is shown in FIG. 2). As a result, and because of the presence of the holographic optical element 60, the light propagates though the liquid crystal 34 and the energized strip electrode 52 into the cover plate 40. The light propagating into the cover plate 40 passes through the front face 44 of the cover plate 40 where it is diffracted by the holographic optical element 64 as explained further below.

If all of the laser diodes 22 were simultaneously illuminated, then a horizontal strip of light would be visible through the cover plate 40-at the location corresponding to the energized strip electrode 52. However, if only a single laser diode 22 is illuminated, then the virtual image of the illuminated laser diode 22 viewed through the energized strip electrode 52 is a single point of light having a horizontal position corresponding to the horizontal position of the laser diode 22. By sequentially illuminating each of the laser diodes 22, the spot of light viewed through the energized strip electrode 52 is horizontally scanned across the front face 44 of the cover plate 40 along the x-axis. In a manner analogous to a cathode ray tube raster scan, the intensity of light emitted by the laser diodes 22 can be modulated to control the intensity of the horizontally scanned spot of light to form a line of pixels of an image. Successive lines can be scanned by sequentially energizing each of the strip electrodes 52, although the strip electrodes 52 can be energized in other manners, such as in an interleaving pattern. However, usually only one strip electrode 52 is energized at a time whenever one or more of the laser diodes 22 is illuminated.

Figure 4:
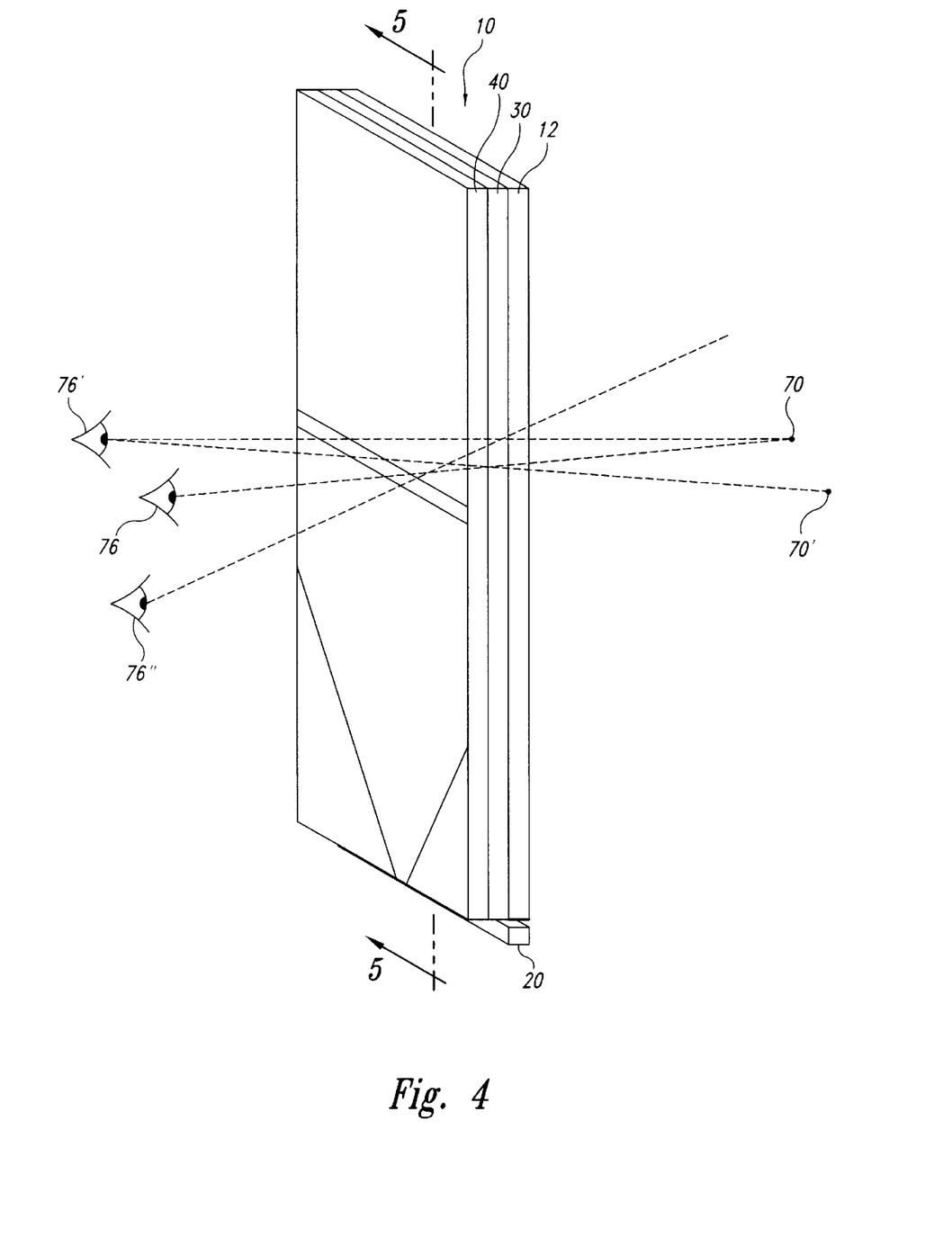
FIG. 4 is an isometric view of the viewing screen of FIG. 1 showing both the position of a virtual image of a point light source created by a light generator and the manner in which the virtual image moves as the eye of a viewer moves horizontally.

The apparent source of the illuminated laser diode 22, i.e., a virtual image 70 of the laser diode 22, is at a location illustrated in FIG. 4. The distance of the virtual image 70 behind the viewing screen 10 corresponds to the total distance the light travels from the laser diode 22 as its bounces back-and-forth from the front and rear faces 16,18 of the base plate 12, respectively, as well as the angle of divergence of the light emanating from the cover plate 40. The horizontal position of the virtual image 70 of the illuminated laser diode 22 corresponds to the horizontal position of the illuminated laser diode 22. However, because the light from the illuminated laser diode 22 diverges, ie., becomes wider, as it propagates through the base plate 12, the light emanating from the cover plate 40 diverges horizontally so that the virtual image 70 is visible from a range of horizontal positions. The horizontal position of the virtual image 70 will not change with respect to the display as an eye 76 of the viewer moves from side-to-side, e.g., from position 76 to position 76', the horizontal position of the virtual image 70 will remain stationary relative to the eye when the position of the eye 76 or 76' relative to the viewing device remains stationary as it does during normal use. Thus, when the eye 76 or 76' is stationary, the horizontal position of the virtual image point 70 in a particular horizontal line will vary only with the horizontal position of the illuminated laser diode 22.

The vertical position of the virtual image 70 of the illuminated laser diode 22 corresponds to the angle at which the light emanates from the cover plate 40. However, in the absence of the holographic optical elements 60, 64, the light emanating from the cover plate 40 would not diverge significantly so that the virtual image 70 would be visible from basically only a single vertical positions. When the eye 76 is positioned as shown in FIG. 4, the virtual image 70 would be visible and appear to be located at 70. However, when the eye was located at 76', the virtual image 70 would not be visible. Furthermore, when a different strip electrode 52' was energized, the virtual image 70 would not be visible when the eye was located at 76. Instead, the virtual image 70 would be visible only when the eye 76 was in a plane extending through the virtual image 70 and the energized strip electrode 52'.

Figure 5:
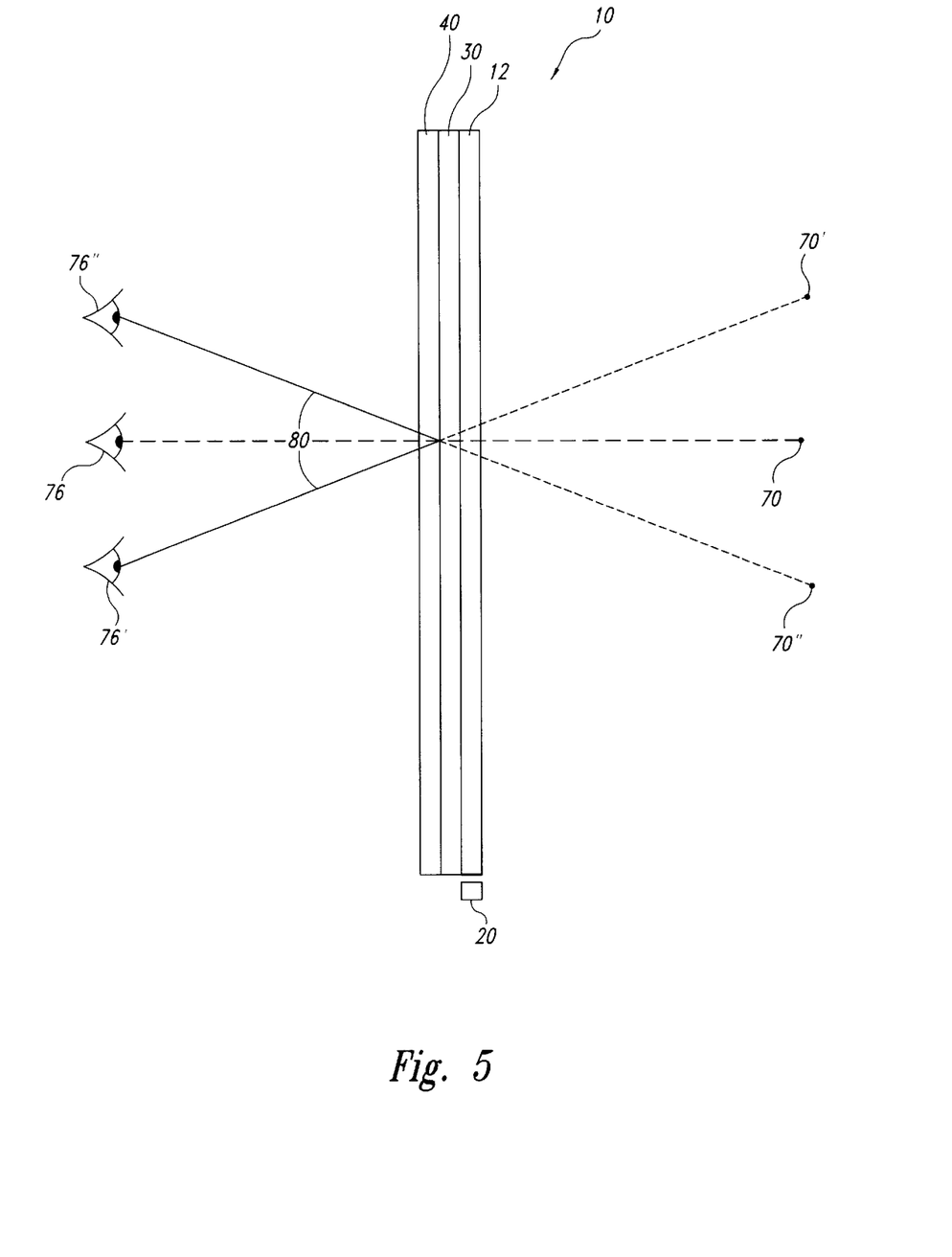
FIG. 5 is a cross-sectional view of the viewing screen of FIG. 4 taken along the line 5—5 of FIG. 4 showing the vertical divergence of light emanating from the viewing screen and the manner in which the virtual image moves as the eye of a viewer moves vertically.

In order to view an image using the viewing screen 10, the virtual images of the laser diodes 22 as they are selectively energized must be visible as all of the strip electrodes are selectively energized. Yet, the viewer cannot move his or her head as each strip electrode 52 is energized to place the eye 76 in the correct vertical position to view the virtual images 70. For this reason, the holographic optical element 64, and optionally the holographic optical element 60, are designed to diffract the light emanating from the cover plate 40 throughout a range of vertical divergence angles 80, as illustrated in FIG. 5. As long as the eye 76 is located within the divergence angle 80, the virtual image 70 will be visible. The vertical position of the virtual image 70 will change as an eye 76 of the viewer moves up and down. Thus, when the eye 76 moves between 76' and 76" the virtual image 70 will move between 70' and 70" respectively. However, the vertical position of the virtual image 70 will remain stationary when the position of the eye 76 relative to the viewing device remains stationary as it does during normal use. Thus, when the eye 76 is stationary, the vertical position of the virtual image 70 will vary only with the vertical position of the strip electrode 52 being energized.

Figure 6:
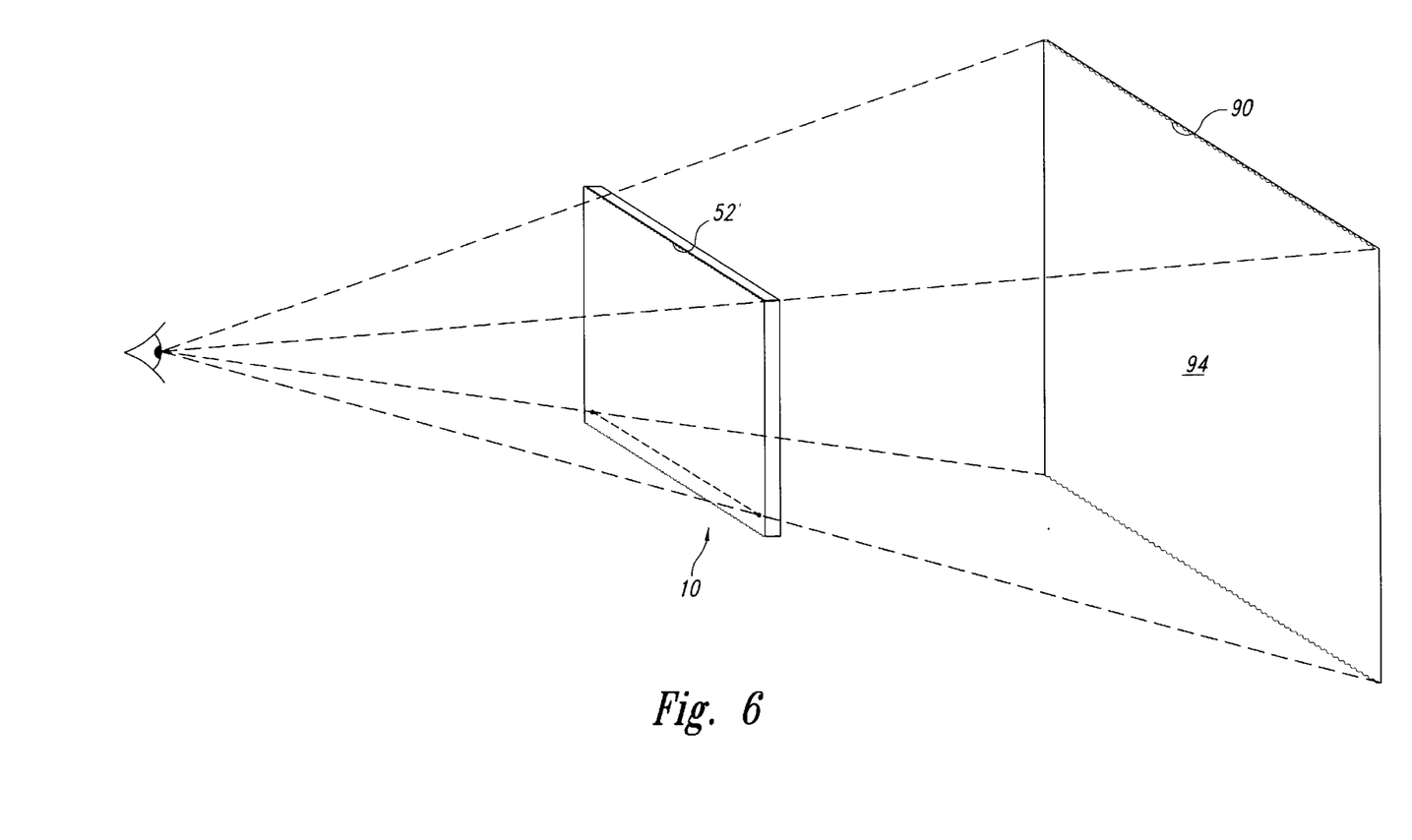
FIG. 6 is an isometric view of the viewing screen of FIG. 1 showing the position of a virtual image line and an entire virtual image created by the viewing screen.

In the preferred embodiment, holographic optical element 64 is structured so that the light emitted through the cover plate 40 in the area of the strip electrode 52 appears to diverge from a point 10 feet behind the viewing screen 10. However, other divergence angles and virtual image distances may also be used. Thus, as the laser diodes 22 are sequentially illuminated at varying intensities while a single strip electrode 52 is energized as illustrated in FIG. 6, a virtual image line 90 will be created 10 feet behind the viewing screen 10. When the laser diodes 22 are sequentially illuminated as each of the strip electrodes 52 are sequentially energized as further illustrated in FIG. 6, a virtual image screen 94 will be created 10 feet behind the viewing screen 10. As long as the intensity of light emitted from the laser diodes 22 is properly modulated, an image corresponding to a video signal will be created on the virtual image screen 94.

In practice, however, the depth of field of the device will be so large that the virtual image viewed through a single eye will appear to be at an indeterminate distance from a few feet to infinity. The actual appearance of depth will depend almost entirely on stereoscopic cues derived from different images presented to two eyes.

Figure 7:
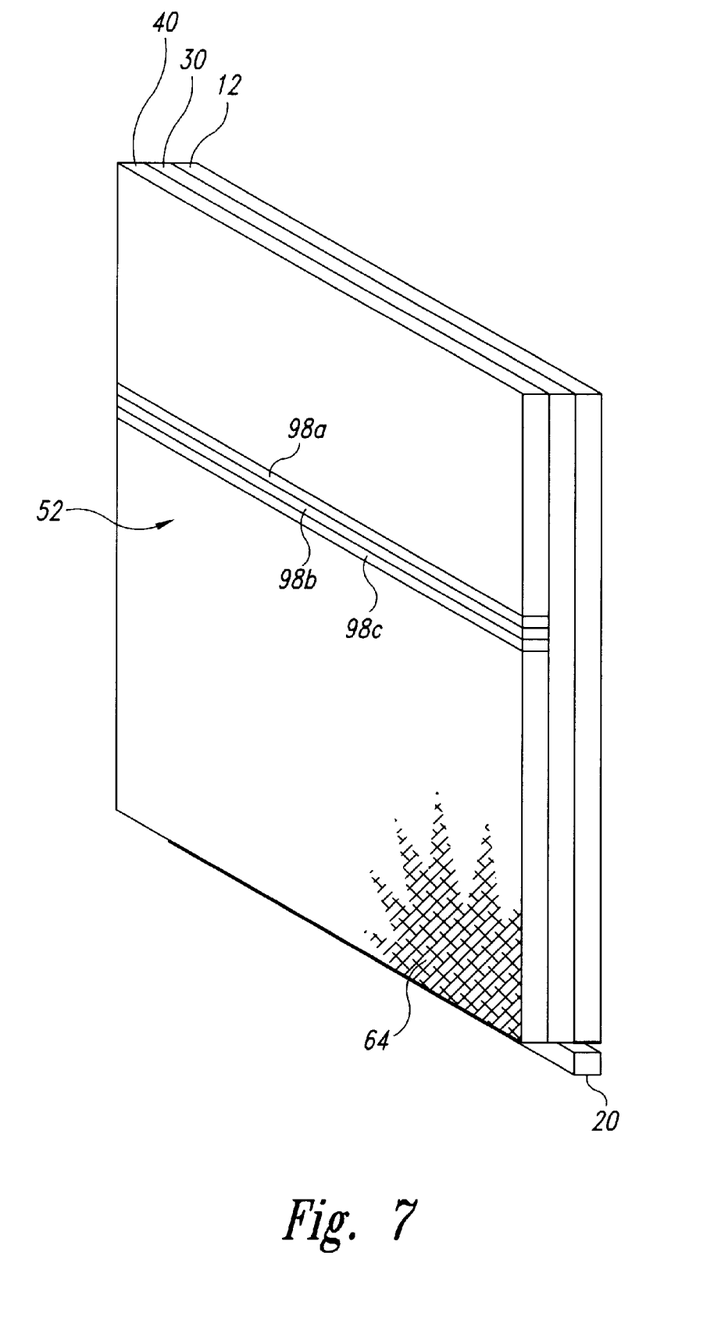
FIG. 7 is an isometric view of the viewing screen of FIG. 1 showing an alternate technique for allowing the viewing screen to generate a color image.

The laser diodes 22 used in the light generator 20 may be a single color to create a monochrome image. However, laser diodes 22 having different colors, for example, red, green and blue, may be used to create a color image. A color image may also be created by other means such as by using a light generator 20 that emits white light or at least light containing red, blue and green light. With reference to FIG. 7, each strip electrode 52 can be divided into three sub-electrodes 98*a,b,c*, each of which causes the cover plate 40 to emit red, blue or green light, respectively. (for purposes of clarity, only one strip electrode 52 is shown in FIG. 7). The color emitted by the cover plate 40 in the area of each sub-electrode 98*a,b,c* may be controlled by the characteristics of the holographic optical element 64 or by placing different color filters over respective sub-electrodes 98*a,b,c*. The light generator 20 is separately modulated for each sub-electrode to alter the relative concentrations of red, blue, and green in each pixel of the virtual image 94.

Figure 8:
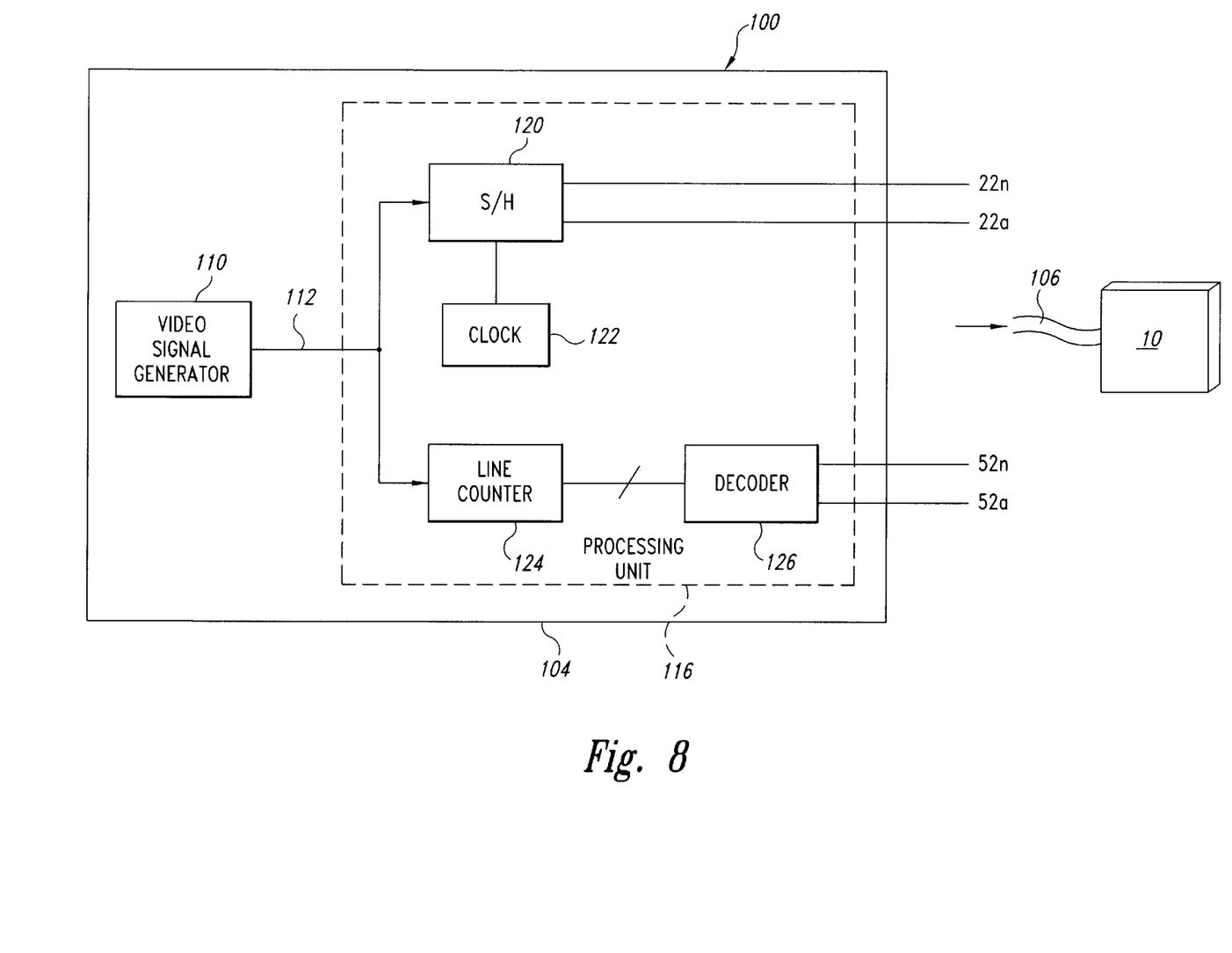
FIG. 8 is a block diagram of a viewing system including the viewing screen of FIG. 1 and an electronic system for providing signals to the viewing screen.

With reference to FIG. 8, a viewing system 100 includes the viewing screen 10 and an electronic system 104 coupled to the viewing screen 10 by suitable means, such as through a cable 106. The electronic system 104 includes a video signal generator 110 which may be, for example, a television receiver, a video recorder, a computer, or the like. The video generator 110 provides a video signal on line 112, such as a conventional NTSC video signal. The video signal on line 112 is applied to a processing unit 116 that is coupled to the laser diodes 22 and the strip electrodes 52. The design of the processing unit 116 is well within the ability of one skilled in the art, and a detailed explanation will thus be omitted for purposes of brevity. For example, an NTSC video signal may be sequentially sampled by a conventional sample and hold ("S/H") circuit 120 driven by a clock 122, with each sample being used to modulate the intensity of a respective laser diode 22a–m. A line counter 124, also receiving the video signal, is reset at the start of each video frame, and is incremented by the horizontal retrace pulse in the NTSC video signal. A digital signal corresponding to the count in the line counter 124 is applied to a decoder 126 having a plurality of outputs, each coupled to a respective strip electrode 52a–n. The decoder 126 generates a strip electrode signal on one of its outputs corresponding to the count value of the digital signal. As the value of the digital signal from the line counter 124 sequentially increments with each horizontal retrace pulse, the strip electrodes 52 are sequentially energized. During the time that each strip electrode 52 is energized, each of the laser diodes 22 is sequentially energized at an intensity corresponding to the value of its respective sample from the S/H circuit 120 to create a corresponding raster line. In the event a color image is to be displayed, separate red, blue, and green modulation signals can be derived from the video signal by conventional means and used to drive the red, blue, and green laser diodes 22, respectively.

The rate at which the laser diodes 22 and the strip electrodes 52 are addressed will, of course, depend on the number of laser diodes 22 and strip electrodes 52 present in the viewing screen 10 and the image refresh rate needed to maintain screen flicker at an acceptable level. The rate at which the laser diodes 22 and the strip electrodes 52 are addressed should be fast enough that the virtual image is refreshed 24 or more times per second. For an 800-by-600 resolution full color image formed by 3 colors of laser diodes 22, it would be necessary to energize 800 strip electrodes 52 every $\frac{1}{30}$ seconds, or at a rate of 1/(24,000), i.e., 1/(30*800), which is about 42 microseconds for each strip electrode 52. This speed is well within the switching speed of ferroelectric liquid crystals. During each of these 42 microseconds, it would be necessary to modulate 1800 laser diodes, i.e., 600 * 3 colors, which would require a rate of about 23 nanoseconds per laser diode 22 but only about 70 nanoseconds per laser diode 22 if all 3 of the 3 laser diodes used to form each pixel were simultaneously energized. The intensity of the light emitted by the laser diodes 22 may be controlled by suitable means, such as by controlling the magnitude or the duty cycle of the drive voltage applied to the laser diodes 22.

Although the electronic system 104 preferably drives each laser diode 22 in the light generator 20 while each strip electrode 52 is energized and before energizing the next strip electrode 52, other operating modes for the electronic system 104 are possible. For example, as explained above, illumination of the laser diodes 22 and energization of the strip electrodes 52 may be interleaved, i.e., all even diodes 22 and/or electrodes 52 are sequentially selected followed by all odd diodes 22 and/or electrodes 52. Also, the electronic system 104 may energize each strip electrode 52 while driving a single laser diode 22 in the light generator 20 before driving the next laser diode 22, although this approach complicates deriving from an NTSC video signal the signals applied to the laser diodes 22.

Figure 9:
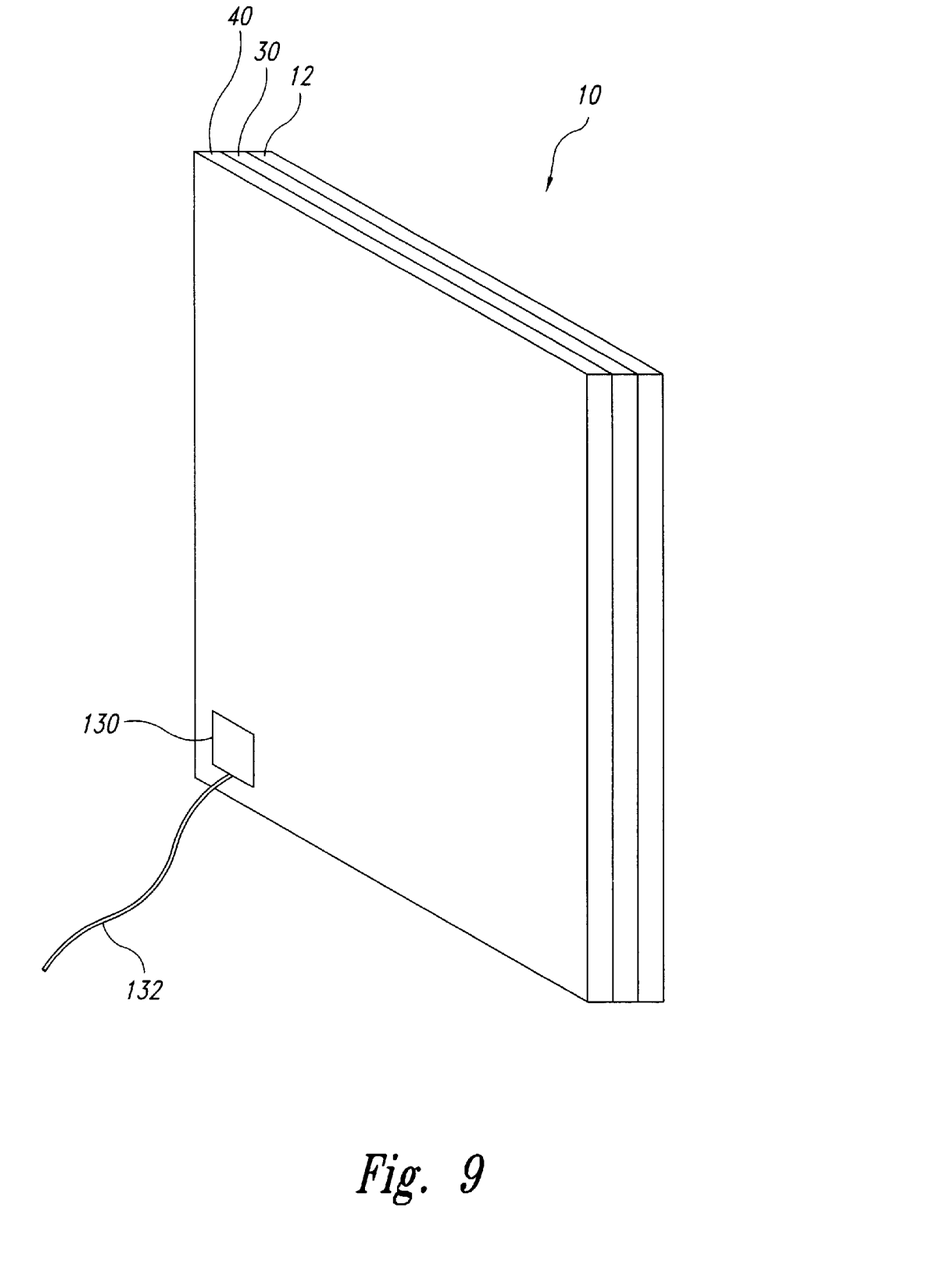
FIG. 9 is an isometric view of the viewing screen of FIG. 1 showing the electronic system of FIG. 8 implemented as an integrated circuit mounted on the viewing screen.

Although the electronic system 104 may be coupled to the viewing screen 10 though a cable 106 as illustrated in FIG. 8, it is preferably implemented as an integrated circuit chip 120 bonded directly to the cover plate 40, as illustrated in FIG. 9. This configuration eliminates the need for bulky and heavy connectors and multiconductor cables and their attendant reliability problems. A video signal is coupled to the integrated circuit chip 130 by suitable means such as a coaxial cable 132, an optical fiber, radio, or infra-red coupling device, for example.

Figure 10:
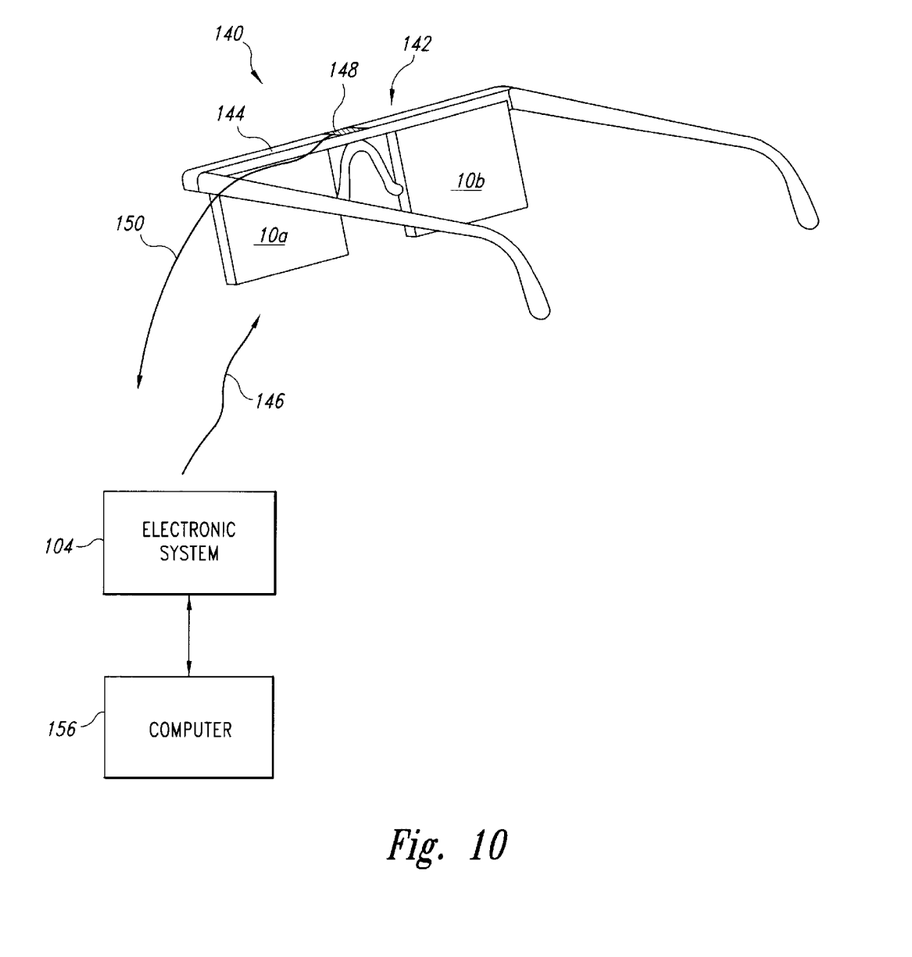
FIG. 10 is an isometric view and block diagram showing a virtual reality viewing system using a pair of the viewing screens of FIG. 1.

A pair of the viewing screens 10 is particularly well adapted for use in a virtual reality viewing system 140, as illustrated in FIG. 10. The viewing system 140 includes a virtual reality viewing device 142 having a pair of viewing screens 10a,b are mounted in a suitable frame 144 and coupled to the electronic system 104 by suitable means 146, including the coupling devices mentioned above. As is well known in the art, different video signals are applied to the viewing screens 10a and 10b so that the viewer sees different images which together create a three dimensional, or stereographic, image. The virtual reality viewing device 142 preferably also includes a conventional sensor 148 that generates a signal indicative of the position and orientation of the viewing device 140. This signal is coupled to the electronic system 104 by suitable means 150, preferably in a manner similar to the manner in which the video signal is coupled to the viewing screen 10. A computer 156 coupled to the electronic system 104 (or alternatively a part of the electronic system 104) adjusts video signals so that the stereographic image corresponds to the position and orientation of the virtual reality viewing device 142. Computers and software that are capable of generating stereographic video signals are conventional and they may be used in the viewing system 140.

Figure 11:
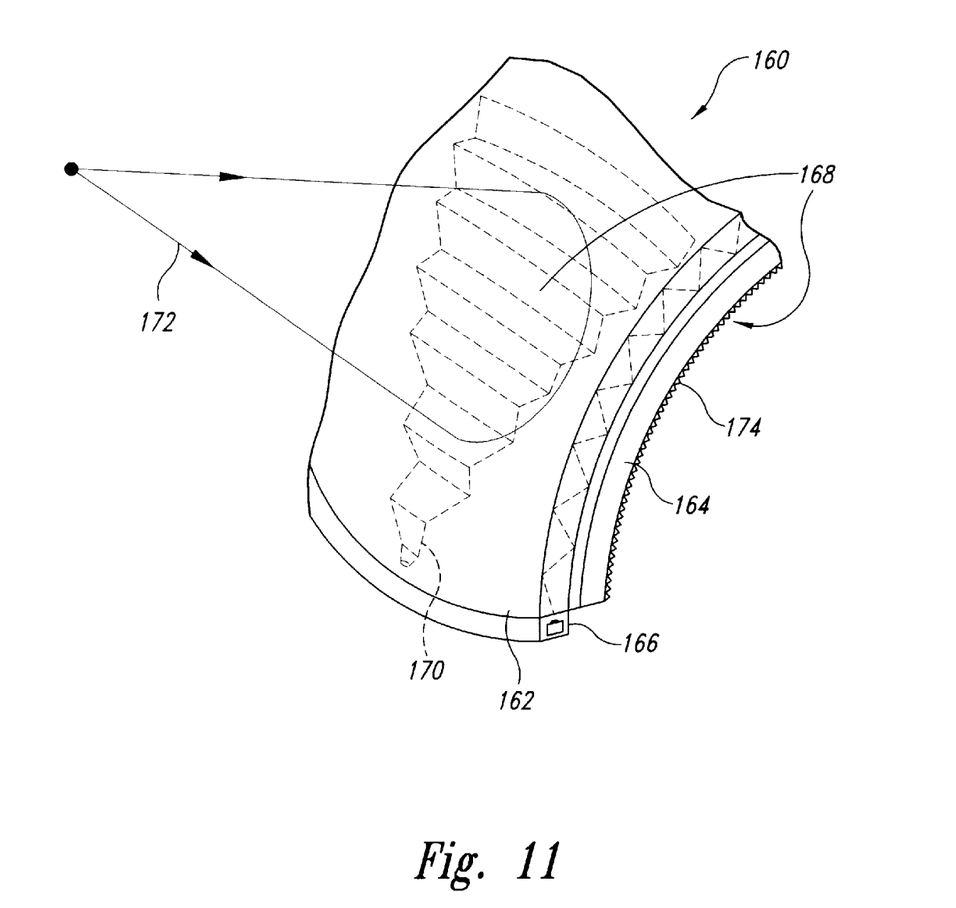
FIG. 11 is an isometric view of an alternative embodiment of a viewing screen according to the invention in which the viewing screen is curved.

The viewing screen 10 shown in FIGS. 1–10 uses a base plate 12 and a cover plate 40 which are planar. However, as illustrated in FIG. 11, a viewing screen 160 may use a base plate 162 and a cover plate 164 that are curved rather than planar. Significantly if light from a light generator 166 is used as a reference beam to form a holographic optical element 168 on the cover plate 164, distortions or nonuniformities in the base plate 162 will be automatically compensated. Consequently, the curved viewing screen 160 can display an image without substantial distortion even if the base plate 162 is distorted.

The manner in which the holographic optical element 168 is formed is also illustrated in FIG. 11. Light from the light generator 162 acts as a reference beam 170 to interfere with an object beam 172 from a light source that emits light that is coherent with respect to the light from the light generator 162. A photographic recording media 174 on the cover plate 164 records the interference between the reference beam 170 and the object beam 172, and the resulting recorded interference is used as the holographic optical element 168. The recorded interference pattern used as the holographic optical element 168 incorporates the distortions in the cover plate 164, including those induced by the curvature of the cover plate 164. When the holographic optical element 168 is subsequently illuminated by light from the light generator 162, the virtual image of the light generator 162 is reconstructed with minimal distortion.

The refractive index modulator can use other phenomena than the effect of electric fields alignment of liquid crystal molecules. In fact, any phenomenon that affects refractive index may be used such as electrophoresis, photorefractive effects, temperature-controlled refractive index, chemical changes, compression. Liquid crystal is used in the preferred embodiment because liquid crystal modulators have reached a high level of commercial development. However, an effect that is independent of light polarization will provide a display with a wider viewing angle.

What is claimed is:

1. A image displaying system comprising: an image displaying device, comprising a first plate comprised of a transparent material and having a first refractive index, a light generator selectively directing light beams into the first plate at a plurality of respective locations along a surface of the first plate, the light beam being directed into the first plate in a manner that causes the light beams to propagate along the first plate with total internal reflection in the first plate;

an index of refraction modulator positioned adjacent the first plate, the index of refraction modulator having a plurality of modulating elements at respective areas spaced apart from each other in the first direction, each of the modulating elements being selectively controllable to either a first refractive index state or a second refractive index state responsive to a respective control signal, the first refractive index state causing the modulating element to have an index of refraction that is sufficiently lower than the index of refraction of the first plate to cause the light beam to remain internally reflected in the first plate in the area of the modulating element, and the second refractive index state causing the modulating element to have an index of refraction that is sufficiently high to allow the light beam to exit the first plate in the area of the modulating element; and an optical element positioned adjacent the index of refraction modulator, the optical element controlling the angle of divergence in the first direction of light exiting the first plate in the area of the modulating element; and an electronic system for providing signals to the light generator and the index of refraction modulator corresponding to a video signal having a plurality of video lines in each video image frame, the electronic system comprising:

a light control circuit coupled to the light generator, the light control circuit causing the intensity of light generated by the light generator at each location to correspond to the amplitude of the video signal at a corresponding point during each video line; and a refractive index modulator control circuit coupled to the index of refractive index modulator, the refractive index modulator control circuit applying a control signal to the index of refraction modulator to selectively cause each of the modulating elements to be in the second refractive index state responsive to a corresponding video line in each video image frame of the video signal.

2. The image displaying system of claim 1 wherein the modulating elements comprise a plurality of strips positioned adjacent each other, each of the modulating elements having its longitudinal axis generally perpendicular to the first direction.

3. The image displaying system of claim 2 wherein the image display device further comprises a video control circuit receiving a video signal corresponding to the intensity of a video image in each of a plurality of video lines, the video control circuit controlling the intensity of each of the light beams in accordance with the amplitude of the video signal at a corresponding position in each line, the video control circuit further generating the control signal to cause each modulating element to be sequentially switched to its high index state responsive to a corresponding line of the video signal.

4. The image displaying system of claim 1 wherein the light generator comprises a plurality of light sources spaced apart along the surface of the first plate, each of the light sources generating a respective light beam responsive to a light energizing signal.

5. The image displaying system of claim 4 further comprising a control circuit coupled to the light sources, the control circuit sequentially applying a light energizing signal to each of the light sources thereby causing the light beams to scan along the surface of the first plate.

6. The image displaying system of claim 1 wherein the light generator comprises a light source generating a light beam, and a beam steering device receiving the light beam, the beam steering device controlling the direction of propagation of the beam responsive to a light control signal to cause the light beam to scan along the surface of the first plate.

7. The image displaying system of claim 1 wherein the light generator comprises a linear array of light emitters.

8. The image displaying system of claim 7 wherein the light emitters comprise a first set of light emitters emitting light having a first color, a second set of light emitters emitting light having a second color, and a third set of light emitters emitting light having a third color, the laser diodes in each of the sets being interspersed among each other so that light of three different colors may be emitted from each of a plurality of localized areas space apart from each other along the array.

9. The image displaying system of claim 1 wherein the light generator comprises a light source generating light containing a plurality of colors, wherein each of the modulating elements is composed of a respective plurality of sub-modulating elements positioned adjacent respective color selective layers so that light emanating from the index of refraction modulator in the area of each of the sub-modulating elements for each modulating element passes through a different color selective layer.

10. The image displaying system of claim 1 wherein the light generator comprises a linear array of laser diodes.

11. The image displaying system of claim 10 wherein the laser diodes comprise a first set of laser diodes emitting light having a first color, a second set of laser diodes emitting light having a second color, and a third set of laser diodes emitting light having a third color, the laser diodes in each of the sets being interspersed -among each other so that light of three different colors may be emitted from each of a plurality of localized areas space apart from each other along the array.

12. The image displaying system of claim 1 wherein the optical element comprises a diffractive optical element structured such that the light exiting the area of each of the modulating elements forms a virtual image of a point of light at a location behind the first plate.

13. The image displaying system of claim 1 wherein the optical element comprise a holographic optical element.

14. The image displaying system of claim 1 further comprising a second optically transparent plate positioned adjacent the index of refraction modulator with the index of refraction modulator positioned between the first and second plates.

15. The image displaying system of claim 14 wherein the optical element is affixed to the second plate.

16. The image displaying system of claim 14 wherein the optical element is mounted on a surface of the second plate, said surface facing the index of refraction modulator.

17. The image displaying system of claim 16 further comprising a second optical element affixed to a surface of the second plate facing away from the index of refraction modulator so that the first and second optical elements are mounted on opposite surfaces of the second plate, the second optical element causing light passing through each point on the second plate to be diffracted in a direction away from a virtual image of the source of said light.

18. The image displaying system of claim 16 further comprising a layer of intermediate index material positioned between the index of refraction modulator and the second plate to facilitate coupling light from the index of refraction modulator to the second plate.

19. The image displaying system of claim 16 wherein the optical element is fabricated to diffract light passing through the index of refraction modulator at an angle having a component extending in the first direction toward the second plate to increase the angle that the light is incident on the second plate, thereby facilitating the coupling of light to the second plate from a modulating element having a high index of refraction.

20. The image displaying system of claim 1 wherein the index of refraction modulator comprises a layer of liquid crystal positioned between first and second sets of electrodes on opposite faces of the layer of liquid crystal, at least one of the electrodes in each of the first and second sets being selectively energizable to alter the index of refraction of the liquid crystal.

21. The image displaying system of claim 20 further comprising a second optically transparent plate positioned adjacent the index of refraction modulator with the layer of liquid crystal positioned between the first and second plates, and wherein the first set of electrodes is located on the first plate and the second set of electrodes is located on the second plate.

22. The image displaying system of claim 20 wherein the second set of electrodes comprises a plurality of strips of conductive, substantially transparent material positioned on a surface of the second plate that faces the layer of liquid crystal, the conductive strips being spaced apart from each other in the first direction and having their respective longitudinal axis extending perpendicular to the first direction.

23. The image displaying system of claim 20 wherein the first set of electrodes comprises a layer of conductive, substantially transparent material positioned on a surface of the first plate that faces the layer of liquid crystal.

24. The image displaying system of claim 20 further comprising an orientation layer coating at least one of the sets of electrodes, the molecules of the orientation layer being oriented in a predetermined direction and causing the liquid crystals coming into contact with the orientation layer to be aligned according to the orientation of the molecules of the orientation layer.

25. The image displaying system of claim 24 wherein the first set of electrodes comprises a layer of conductive, substantially transparent material positioned on a surface of the first plate that faces the layer of liquid crystal, and wherein the orientation layer overlies the single layer of conductive, substantially transparent material.

26. The image displaying system of claim 24 wherein the orientation layer comprises a layer of polymeric material having its molecules aligned in the predetermined direction.

27. The image displaying system of claim 1 wherein the first plate is planar.

28. The image displaying system of claim 1 wherein the first plate is curved.

29. The image displaying system of claim 1 wherein the image display device is mounted in a frame along with a second image display device, the frame being adapted to position each of the image display devices in front of a respective eye of an individual wearing the frame, and wherein the electronic system further comprises a light control circuit and a refractive index modulator control circuit for the second image display device, the light control circuit and the refractive index modulator control circuit for each of the image display devices receiving a respective first and second video signal, and wherein the electronics system further comprises a processor generating the first and second video signals to cause a stereographic image to be viewable through the image display devices.

30. A method of displaying an image corresponding to a video signal having a plurality of video lines in each video image frame, comprising:

generating light from a point source that scans along a first path, the intensity of the light during each scan corresponding to the amplitude of the video signal during each video line;

coupling the light into a second path extending generally perpendicular to the first path; and coupling light from the second path at a distance from the first path corresponding to the position of the video line in each video image frame of the video signal, the light being coupled from the second path to a final path where the light is adapted to be viewed.

31. The method of claim 30 wherein the step of generating light from a point light source scans along the first path comprises:

providing a plurality of light emitting devices extending along the first path; and selectively illuminating the light emitting devices.

32. The method of claim 30 wherein the step of generating light from a point light source scans along the first path comprises:

generating a beam of light;

steering the beam of light so that it scans along the first path.

33. The method of claim 30 wherein the step of generating light from a point light source that scans along the first path comprises:

generating light having a plurality of colors that scans along a first path, the intensity of the light of each color during each scan corresponding to the amplitude of the video signal during each video line and the color of the light generated corresponding to color information in the video signal during each video line.

34. The method of claim 30 wherein the step of coupling light from the second path comprises coupling light from the second path through one of at least three color selective media, the color selective media through which the light is coupled corresponding to color information in the video signal during each video line.

35. The method of claim 30 wherein the step of coupling light from the second path further comprises diffracting the light so that it has a predetermined divergence angle around the direction of the second path.

36. The method of claim 30 wherein the step of coupling light from the second path comprises:

coupling the light in the second direction through a light transmissive medium, the light transmissive medium having an index of refraction relative to a surrounding index of refraction normally causing the light to be totally internally reflected in the light transmissive-medium; and selectively altering the surrounding index of refraction at a location along the second path so that the light is no longer totally internally reflected in the light transmissive medium.

37. The method of claim 30 wherein the step of coupling light from the second path comprises:
  diffracting the light so that it has a predetermined divergence angle around the direction of the second path.

38. The method of claim 30 wherein the first and second paths are respective straight lines.

39. The method of claim 30 wherein the first path is a curved line.

* * * * *